United States Patent [19]
Yogo et al.

[11] Patent Number: 5,289,261
[45] Date of Patent: Feb. 22, 1994

[54] DEVICE FOR MEASURING A THREE-DIMENSIONAL SHAPE OF AN ELONGATE MEMBER

[75] Inventors: Teruaki Yogo, Aichi, Japan; John M. Fitts, Santa Monica, Calif.

[73] Assignee: Opton, Co., Ltd., Japan

[21] Appl. No.: 850,557

[22] Filed: Mar. 13, 1992

[30] Foreign Application Priority Data

Sep. 17, 1991 [JP] Japan .................................. 3-236359
Nov. 15, 1991 [JP] Japan .................................. 3-300633

[51] Int. Cl.$^5$ ............................................. G01B 11/24
[52] U.S. Cl. ..................................... 356/376; 250/560
[58] Field of Search ............. 356/376, 388, 375, 387,
356/383, 384, 394, 398; 250/560, 561; 382/8,
62, 63; 358/106, 107

[56] References Cited

U.S. PATENT DOCUMENTS

| | | | |
|---|---|---|---|
| 4,122,525 | 10/1978 | Eaton | 356/398 |
| 4,778,274 | 10/1988 | Yogo | 356/376 |
| 4,848,912 | 7/1989 | Sano et al. | 356/376 |
| 4,972,090 | 11/1990 | Eaton | 356/376 |
| 5,008,555 | 4/1991 | Mundy | 356/376 |
| 5,046,852 | 9/1991 | Hametner et al. | 356/376 |

FOREIGN PATENT DOCUMENTS

| | | | |
|---|---|---|---|
| 0188507 | 10/1984 | Japan | 356/376 |
| 0218010 | 10/1985 | Japan | 356/376 |
| 0260105 | 11/1986 | Japan | 356/376 |
| 62-36514 | 2/1987 | Japan . | |

Primary Examiner—Richard A. Rosenberger
Assistant Examiner—Hoa Q. Pham
Attorney, Agent, or Firm—Davis, Bujold & Streck

[57] ABSTRACT

A device for measuring a three-dimensional shape of an elongate member which comprises a first image detector and a second image detector, a projected image computing device, and a center line computing device. The first image detector and the second image detector detect a two-dimensional image of an image of the elongate member projected onto a planar surface. The projected image computing device computes each central line of the projected image of the elongate member from each of the images detected by the first image detector and the second image detector. Then, the center line computing device detects a plane including the central line obtained from the first image detector and the position of the first image detector, and another plane including the other central line obtained from the second image detector and the position of the second image detector, thereby obtaining a center line of the elongate member along which the planes intersect each other.

21 Claims, 9 Drawing Sheets

DEVICE FOR MEASURING A THREE-DIMENSIONAL SHAPE OF AN ELONGATE MEMBER

BACKGROUND OF THE INVENTION

This invention relates to a device for measuring a three-dimensional shape of a bent elongate member.

Currently, several devices for measuring a three-dimensional shape of a bent elongate member have been proposed. Such a device is used to examine whether an elongate member is bent in accordance with a desired design. A typical measuring device has been disclosed, for example, in Japanese Published Unexamined Patent Application No. S62-36514, which comprises a three-dimensionally moving device and contacting members attached thereto. According to the measuring device, the three-dimensionally moving device moves the contacting members into contact with the periphery of a member to be measured and detects the three-dimensional coordinates of the contacting members on the periphery of the member. After this detection is repeated several times, the measuring device determines the shape of the member from a plurality of the coordinates thus obtained.

In the prior art, the necessity of the three-dimensionally moving device makes the measuring device complicated structurally. Furthermore, the operation of attaching the contacting members to the member is bothersome for the operator.

SUMMARY OF THE INVENTION

Wherefore, an object of the present invention is to provide a device for measuring the three-dimensional shape of an elongate member, said device having a simple structure and only requiring simple operations.

To attain the above object, a device for measuring a three-dimensional shape of an elongate member of the present invention, as illustrated in FIG. 1, comprises a first image detector M2 and a second image detector M3, both of which are spaced away from each other at predetermined positions and detect a two-dimensional image of a bent elongate member M1 mounted on a planar surface at measuring points on the elongate member M1, a projected image computing means M4 for computing each central line of the projected images of the elongate member M1 on the planar surface from each of the two-dimensional images of the elongate member M1 detected by the first image detector M2 and the second image detector M3, and a center line computing means M5 for computing a plane including the central line obtained from the first image detector M2 and the position of the first image detector M2, and another plane including the other central line obtained from the second image detector M3 and the position of the second image detector M3, thereby obtaining a center line of the elongate member M1 where the planes intersect each other.

DETAILED DESCRIPTION OF A PREFERRED EMBODIMENT

Figure 1:
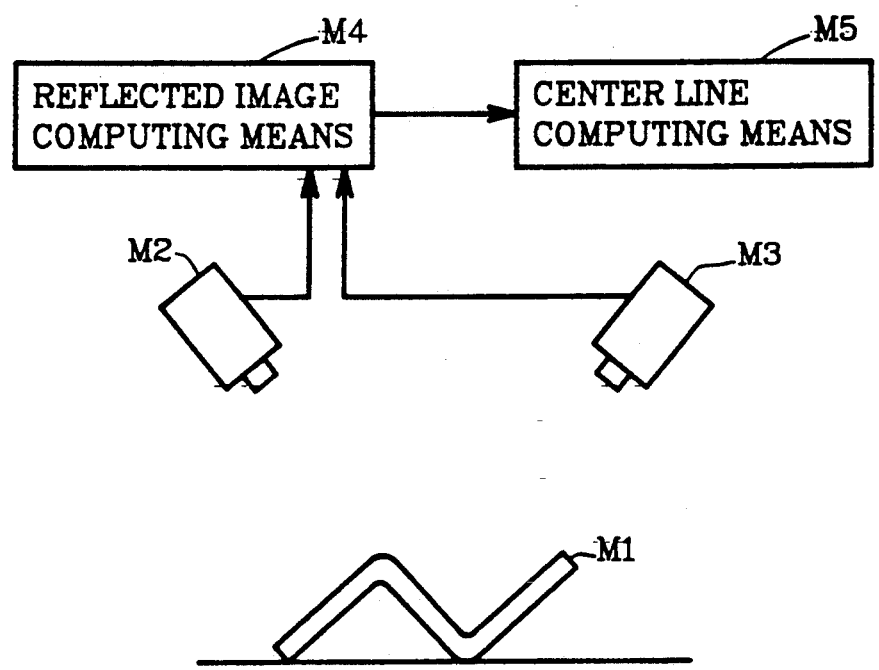
FIG. 1 is a block diagram showing a basic structure of the device of the present invention for measuring a three-dimensional shape of an elongate member.
Figure 2:
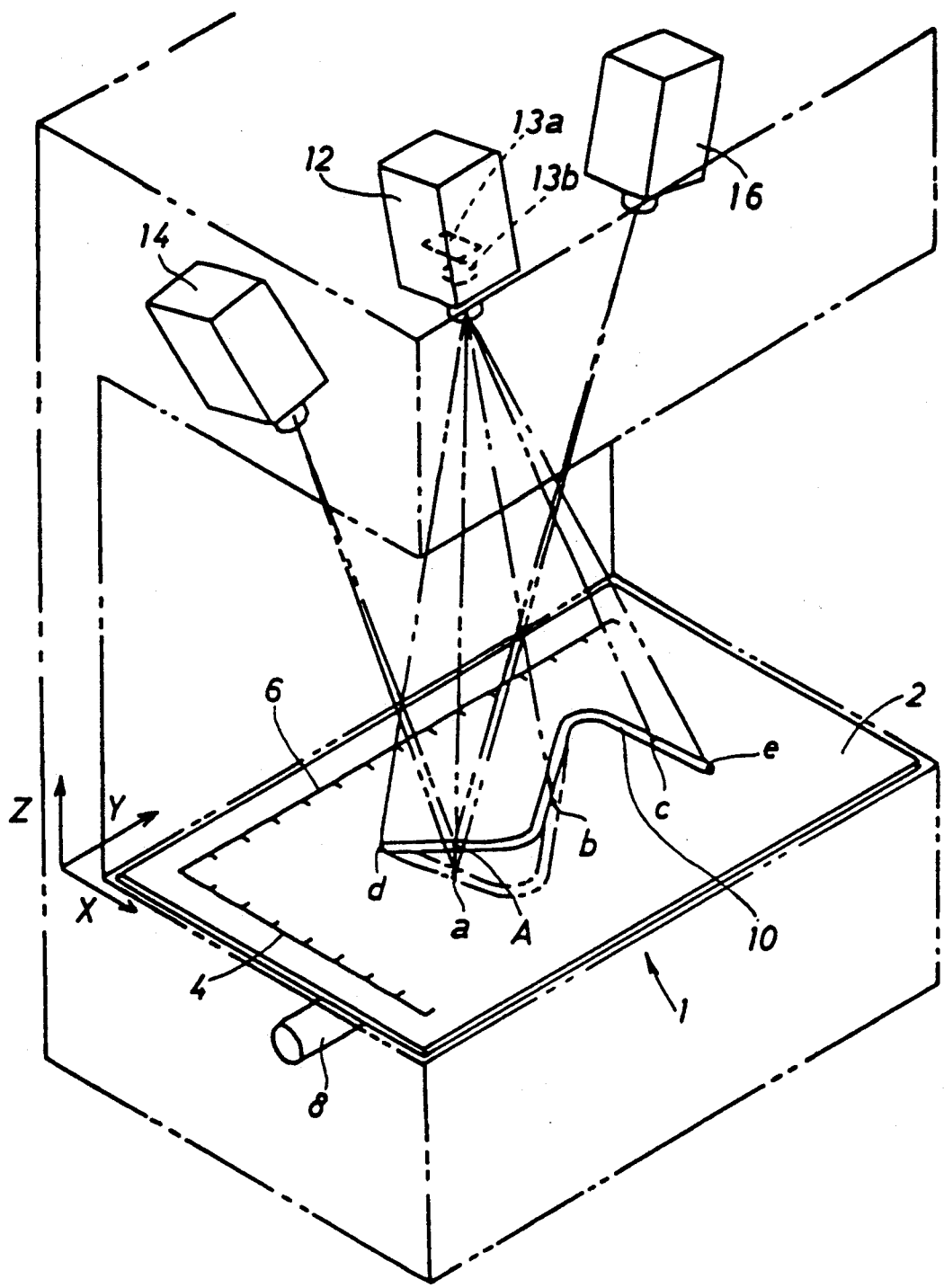
FIG. 2 is a schematic perspective view showing the device for measuring a three-dimensional shape of an elongate member.

Referring first to FIG. 2, a table 1 made of translucently frosted glass comprises a planar surface 2 at the top face. The planar surface 2 has a coordinate axis X in the longitudinal direction, a coordinate axis Y in the lateral direction, and another coordinate axis Z is set vertical to the planar surface 2. Thereby, the X, Y and Z coordinates are determined on the basis of the planar surface 2. Graded scales (indicia) 4 and 6 are provided on the planar surface 2 at regular intervals along the X and Y axes, respectively. The scales 4 and 6 may be lines drawn in a grid pattern at unit length intervals or may be dots put at the intersections of the lines. A fluorescent light 8 is located under the table 1 and serves to illuminate a member to be measured 10 mounted on the table 1. The member 10 is an elongate member, such as a round bar or a pipe, which is bent three-dimensionally.

A whole image detector 12 is positioned above the table 1, said whole image detector 12 comprising a two-dimensional image pickup element 13a and a lens 13b. A whole image of the table 1 passes through the lens 13b forming a whole image on the two-dimensional image pickup element 13a. The whole image on the image pickup element 13a covers a space in the range of 750 mm in length in the X axis direction, and 1250 mm in length in the Y axis direction of the planar surface 2. The two-dimensional image pickup element 13a resolves an image into 512×512 pixels, each of which is quantized, converted into electric charge according to its light quantity, and then, output as image data. The arrangement is such that the whole image detector 12 is positioned above the center of the planar surface 2, which places the center of the two-dimensional image pickup element 13a at a predetermined position (x0, y0, z0) on the X, Y and Z coordinates.

There are provided a first image detector 14 and a second image detector 16 with the whole image detector 12 positioned therebetween. The image detectors 14 and 16 are spaced a predetermined distance away from each other at a predetermined height from the planar surface 2.

Figure 3:
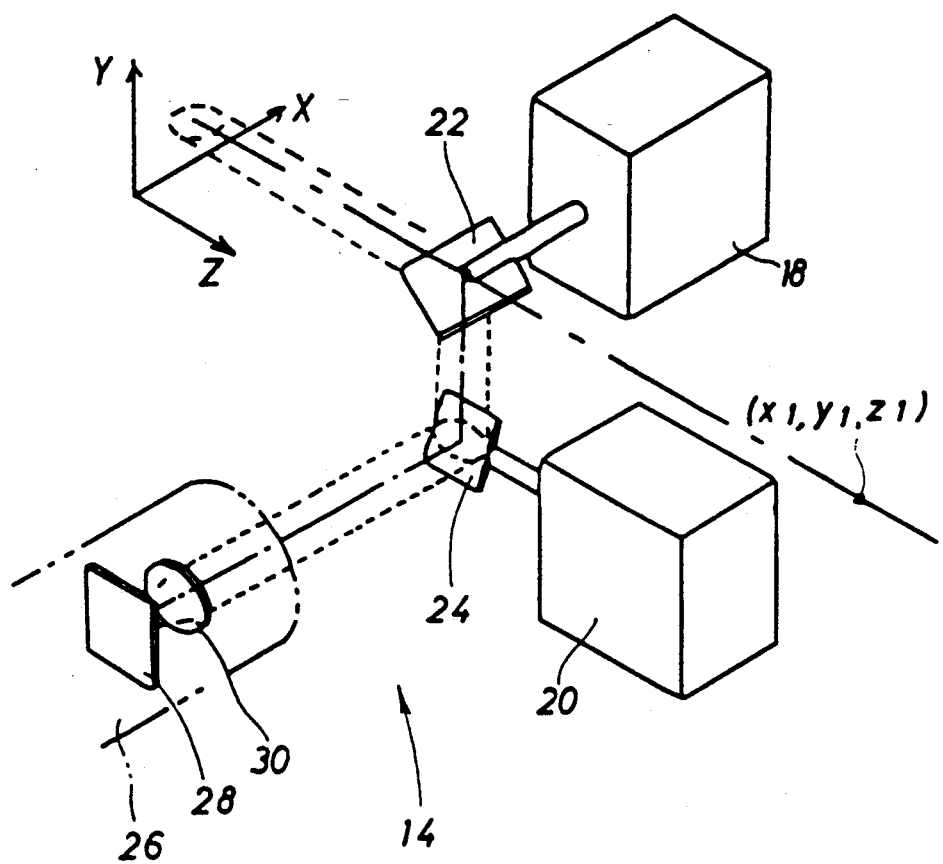
FIG. 3 is a schematic perspective view showing an image detector of the device for measuring a three-dimensional shape of an elongate member.

As shown in FIG. 3, the first image detector 14 comprises a first scanner 18 and a second scanner 20. The first scanner 18 is provided with a mirror 22 which is rotated about an axis parallel to the X axis by a pulse motor 23 shown in FIG. 4. The mirror 22 reflects the member 10 which is mounted on the table 1. The second scanner 20 is provided with another mirror 24 which is rotated about an axis parallel, to the Z axis by another pulse motor 25. The mirror 22 reflects the image of the member 10 onto the mirror 24. The first image detector 14 further comprises a two-dimensional image pickup device 26 which includes a two-dimensional image pickup element 28. The arrangement is such that the image on the mirror 24 is turn formed on the two-dimensional image pickup element 28 via a lens 30. The two-dimensional image pickup element 28 resolves images into 512×512 pixels, each of which is quantized, converted into electric charge according to its light quantity, and then, output as image data.

The image formed on the two dimensional image pickup element 28 is only of a part of the member 10 at the measuring points. The size of the partial image is determined from the relationship between the measuring accuracy and the number of pixels, i.e. 512×512. The partial image covers in the range of 150 mm×150 mm of the planar surface which is output as the enlarged image data of the member 10. The center of the two-dimensional image pickup element 28 is located at a predetermined position (x1, y1, z1) on the X, Y and Z coordinates. The position (x1, y1, z1) does not mean the real position of the two-dimensional image pickup element 28 on the coordinates. In practice, it is an optical position of the element 28 on the coordinates since the image pickup element 28 is reflected by the mirrors 22 and 24. The position (x1, y1, z1) is on an extension of the line drawn between the member 10 on the table 1 and the mirror 22. The distance between the position (x1, y1, z1) and the mirror 22 is equal to the combined distances between the mirror 22 and the mirror 24 and between the mirror 24 and the two-dimensional image pickup element 28.

Figure 4:
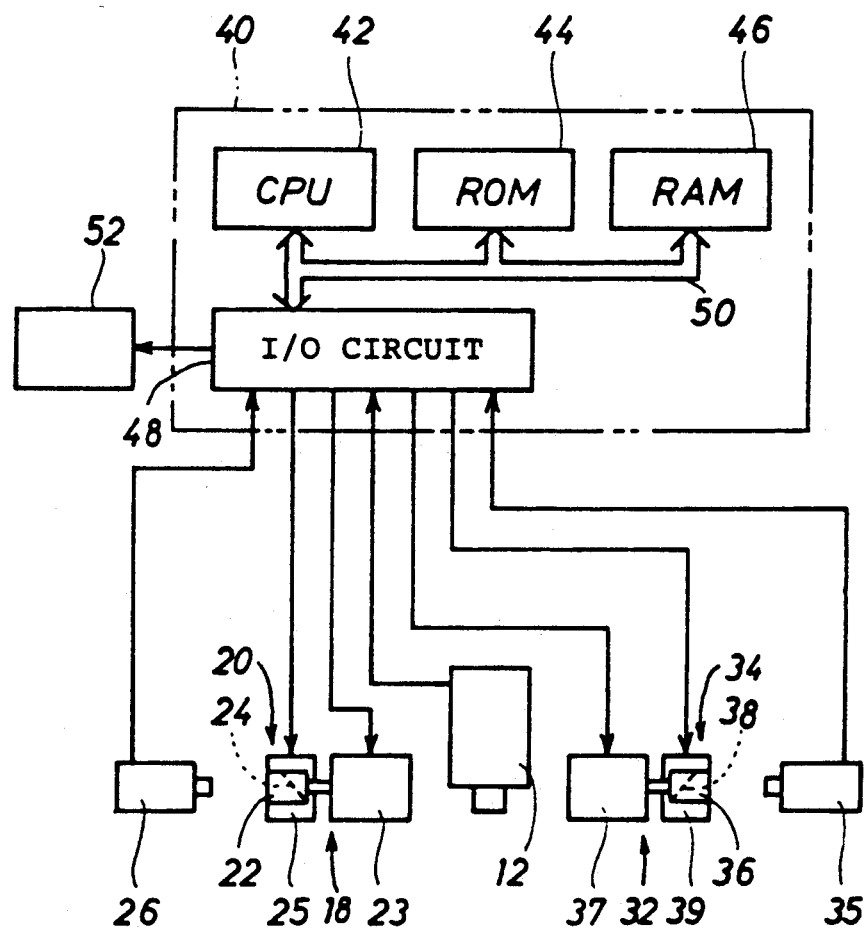
FIG. 4 is a block diagram showing the electrical system of the device for measuring a three-dimensional shape of an elongate member.

The second image detector 16 (FIG. 4) comprises a first scanner 32 and a second scanner 34, and further a two-dimensional image pickup device 35 in the same manner as the first image detector 14 is constructed. As illustrated in FIG. 4, the first scanner 32 rotates a mirror 36 by means of a pulse motor 37, and the second scanner 34 rotates a mirror 38 by means of a pulse motor 39, thereby scanning the planar surface 2. The two dimensional image pickup device 35 includes a two-dimensional image pickup element (not shown), of which the center is located at a predetermined position (x2, y2, z2).

The whole image detector 12, the first image detector 14, and the second image detector 16 are connected to a control circuit 40. The control circuit 40 comprises a CPU 42, a ROM 44, a RAM 46, and serves as a logical operation circuit. The CPU 42 may be a known device in the art. The ROM 44 stores controlling programs and data in advance. The RAM 46 can be accessed for a Read and Write Operation. An I/O circuit 48 is connected with the CPU 42, the ROM 44 and the RAM 46 via a common bus 50. The data from the whole image detector 12, the first image detector 14 and the second image detector 16 is input from the I/O circuit 48 into the CPU 42. Then, the CPU 42 outputs the results of measurements received from the I/O circuit 48 onto a display 52 employing the programs and data stored in the ROM 44 and the RAM 46.

Figure 5:
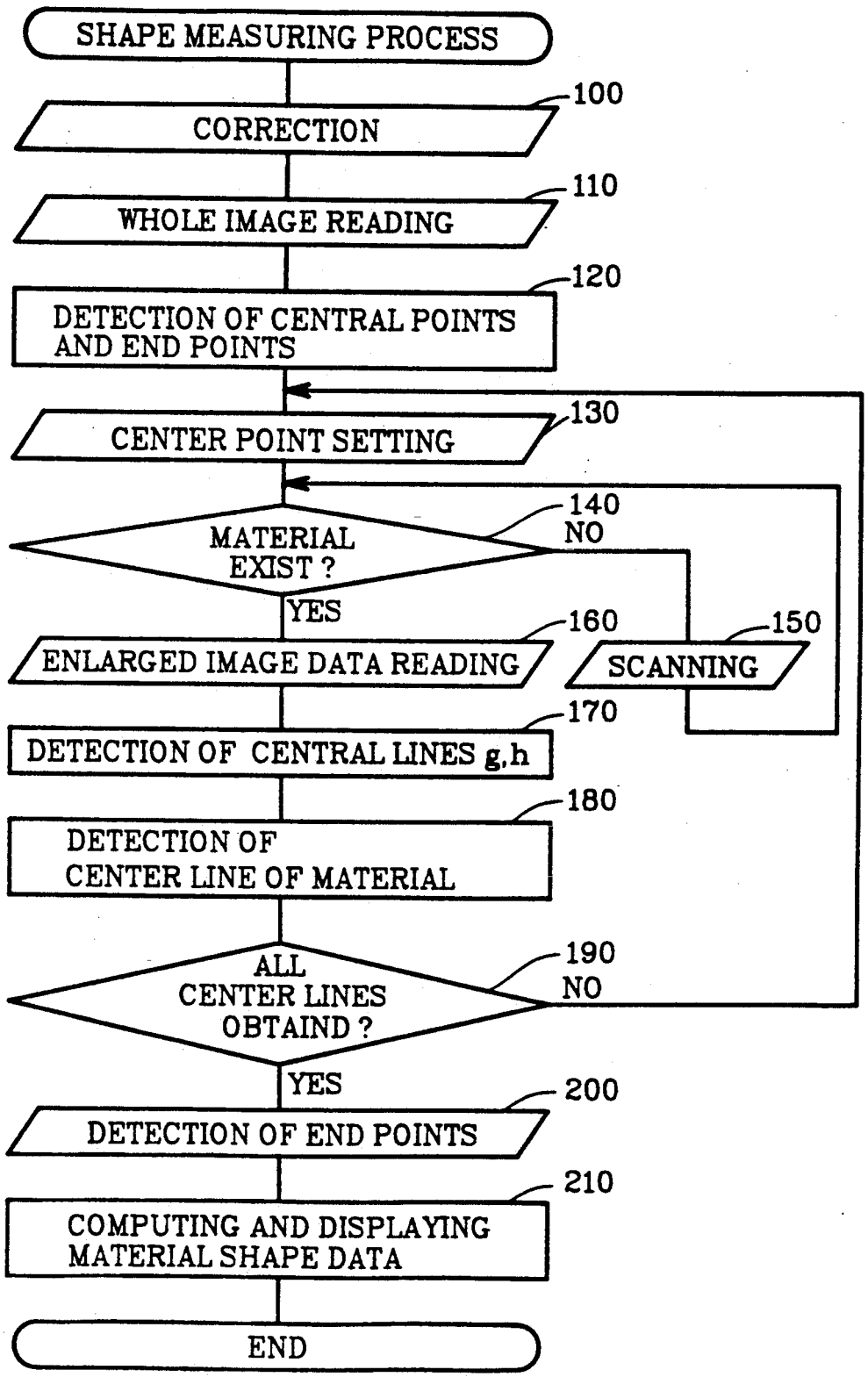
FIG. 5 is a flowchart showing the measuring processes in a control circuit of the device for measuring a three-dimensional shape of an elongate member.

The operation of the device for measuring a three-dimensional shape of an elongate member of the present invention is now described with reference to the flowchart in FIG. 5. When the power is turned on, the first image detector 14 and the second image detector 16 optically scan the planar surface 2 for a correcting (calibrating) operation (Step 100). Since the output image of the member 10 which is optically scanned changes in length according to the angle of the image detectors 14 and 16 relative to the positions of the image detectors 14 and 16 on the X and Y coordinates, this step corrects the length of images by the following method. First, the scales 4 and 6 on the planar 2 are scanned by rotating the pulse motors 23, 25, 37 and 39. Then the image data at several positions on the X and Y axes is detected from the number of pulse shots generated by the pulse motors. The correction data for the image length at each position on the planar surface 2 is thus obtained, establishing the number of pixels per division of the scales 4 and 6 as unit lengths.

Then the whole image detector 12 detects the whole image of the member 10 (Step 110). The whole image data thus obtained is converted into binary codes according to a predetermined threshold value. Then the whole image detector 12 detects the central points of the straight line portions and the end points of the member 10 from the outline of the whole image (Step 120). When the member 10 illustrated in FIG. 2 is measured, the whole image detected by the whole image detector 12 corresponds to the projected image of the member 10 on the planar surface 2. Therefore, the whole image detector 12 detects central points a (xa, ya), b (xb, yb), and c (xc, yc) of each straight line portion of the projected image on the X and Y coordinates. The whole image detector 12 also detects temporary end points d (xd, yd) and e (xe, ye) of the image of the member 10 on the X and Y coordinates.

Then the first scanners 18, 32 and the second scanners 20 and 34 are rotated by generating pulse signals to the pulse motors 23, 25, 37, and 39 such that the centers of the images formed in the first and the second image detectors 14 and 16 correspond to the central point a (xa, ya) (Step 130). At Step 140, it is determined whether the image of the member 10 corresponds to the projected image detected at Step 120.

Figure 6:
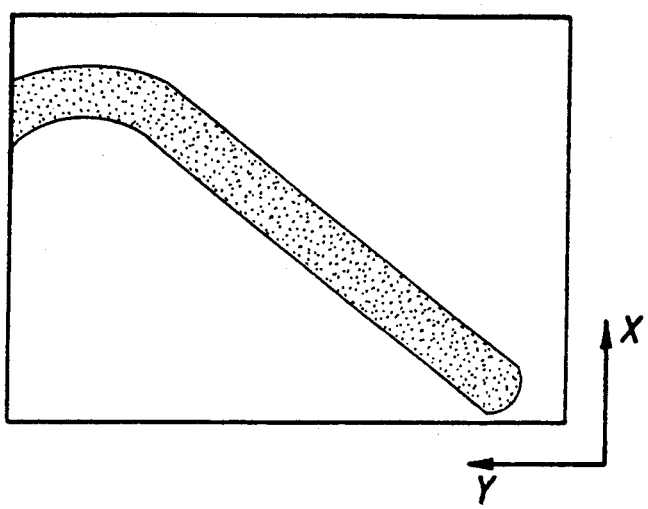
FIG. 6 is an explanatory view of an image detected by a first image detector after converted into binary codes.
Figure 7:
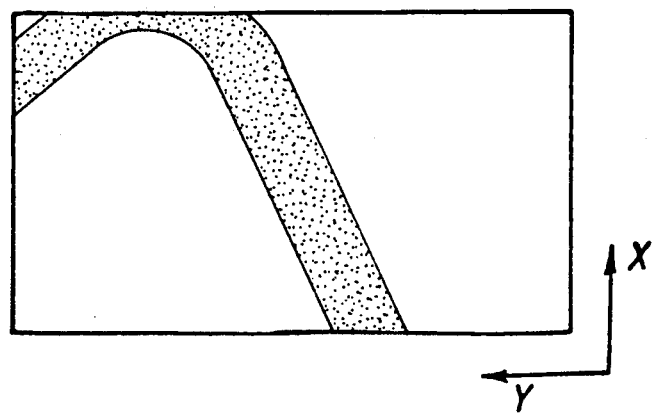
FIG. 7 is an explanatory view of an image detected by a second image detector after converted into binary codes.

When a central point A of the member 10 on the three-dimensional coordinates has a predetermined height from the planar surface 2 as illustrated in FIG. 2, the image of the member 10 is not found in the images formed in the image detectors 14 and 16 when the centers of the images in the image detectors 14 and 16 correspond to the central point a on the planar surface 2. In this case, the first scanners 18, 32 and the second scanners 20, 34 are rotated for scanning, thereby setting the member 10 at the centers of the images formed in the image detectors 14 and 16 (Step 150). The central point A on the three-dimensional coordinates is on the straight line drawn between the center of the whole image detector 12 (x0, y0, z0) and the central point a on the planar surface 2 (xa, ya). Thus, the period of time for the scanning of the first scanners 18, 32 and the second scanners 20, 34 can be shortened by executing the scanning along this straight line. FIG. 6 illustrates the partial image of the member 10 which is positioned substantially at the center of the image formed in the first image detector 14. FIG. 7 also shows a partial image of the member 10 which is located substantially at the center of the image formed in the second image detector 16. The scanning is completed when the image of the member 10 is set at the center of the images of the image detectors 14 and 16. Then, the enlarged image data is obtained from the first and the second image detector 14 and 16 (Step 160). The enlarged image data corresponds to the projected image of the member 10 on the planar surface 2.

At Step 170, the enlarged image data is converted into binary codes according to a predetermined threshold value. Central lines of the projected images g and h on the X and Y coordinates of the planar surface 2 are computed from the outline of the projected image employing equations (1):

$$Y = AgX + Bg$$
$$Y = AhX + Bh \qquad (1)$$

Figure 8:
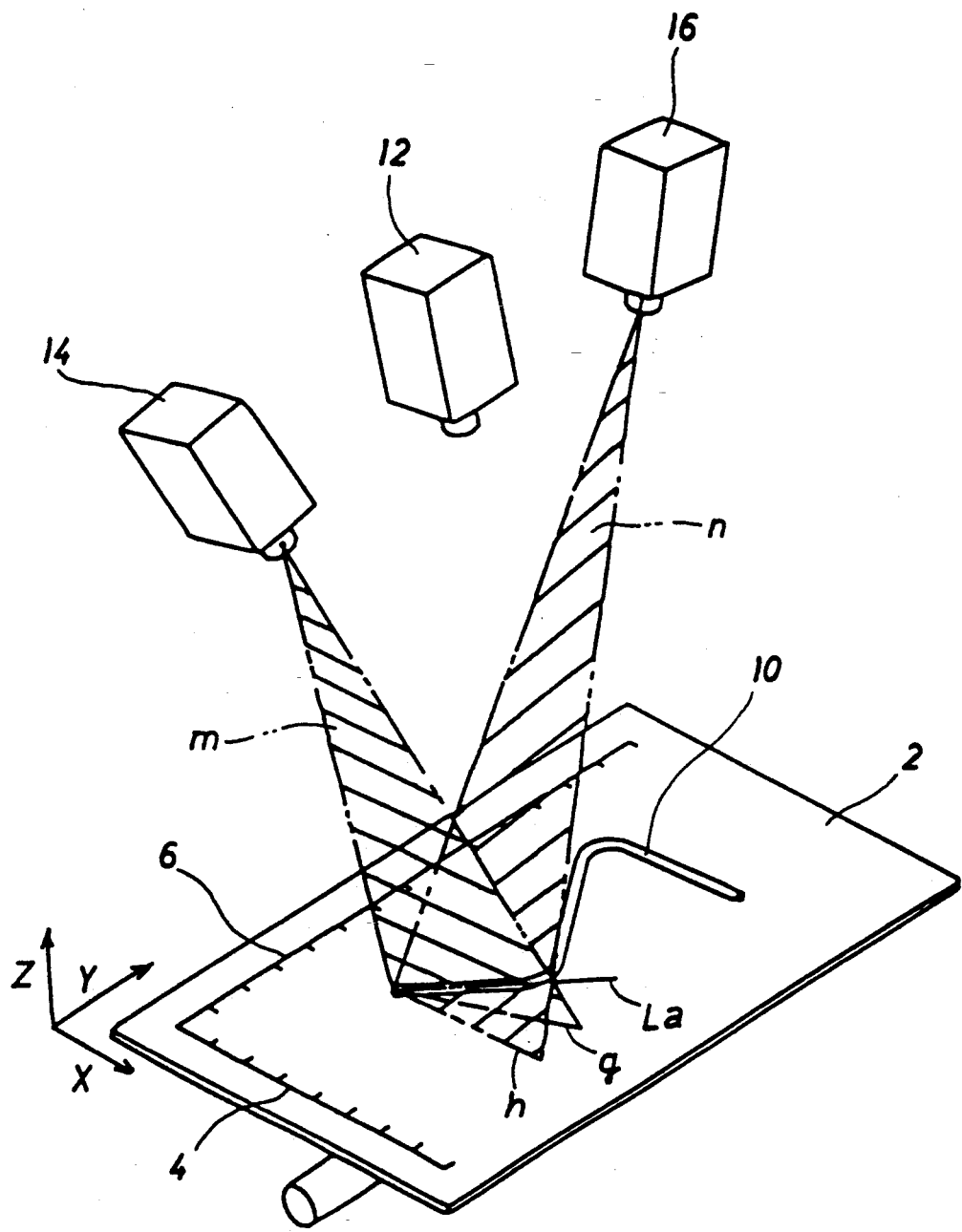
FIG. 8 is an explanatory perspective view illustrating a method for computing a center line of an elongate member from planes extending from and including the central lines of the projected images of the elongate member.

Ag and Bg are the coefficients specifying straight line g in the xy coordinates, and Ah and Bh are the coefficients specifying the straight line h in the xy coordinates. See lines g and h in FIG. 8. At Step 180, a center line La of the member 10 on the X, Y and Z coordinates based on the central point a is computed by the following steps. First, as illustrated in FIG. 8, a plane m on the X, Y and Z coordinates, which includes the central line g and the coordinates of the first image detector 14 (x1, y1, z1), and a plane n on the X, Y and Z coordinates, which includes the central line h and the coordinates of the second image detector 16 (x2, y2, z2), are obtained by equations (2):

$$AmX + BmY + CmZ + Dm = 0$$
$$AnX + BnY + CnZ + Dn = 0 \qquad (2)$$

Am, Bm, Cm, and Dm are the coefficients specifying the plane m in the xyz coordinates, and An, Bn, Cn, and Dn are the coefficients specifying the plane n in the xyz coordinates. See planes n and m in FIG. 8. Next, since the planes m and n intersect each other along the center line La, the line La is calculated by equations (3):

$$Y = ALaX + BLa$$
$$Z = CLaX + DLa \qquad (3)$$

ALa and BLa are the coefficients specifying the straight line La in the xy coordinates, and CLa and DLa are the coefficients specifying the straight line La in the xz coordinates. See FIG. 8. At Step 190, it is determined whether Steps 130 through 180 should be executed for each of the center points a through c which were obtained by Step 120.

Figure 9:
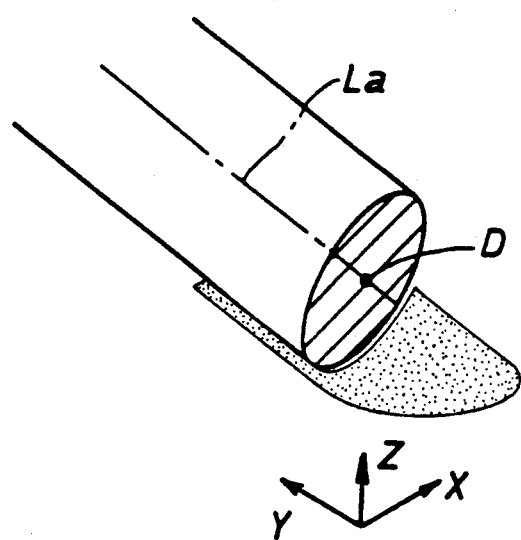
FIG. 9 is an explanatory view illustrating a method for detecting an end point of the elongate member from an end outline of the projected image of the elongate member.

After the center lines La, Lb, and Lc for the central points a, b and c, respectively, are obtained, the coordinates of end points D and E of the member 10 are computed as follows (Step 200). First, the scanning by the first scanners 18, 32 and the second scanners 20, 34 is effected such that the temporary end points d and e obtained at Step 120 are positioned at the centers of the images formed in the first and second detectors 14 and 16. Next, the image data thus obtained is converted into binary codes according to a predetermined threshold value. Then the outline of the end plane of the projected image of the member 10 which is formed on the planar surface 2 is measured, thereby obtaining an equation of a curved line of the end plane on the X and Y coordinates. When the end plane of the member 10 has a circular shape as illustrated in FIG. 9, the curved line on the planar surface 2 is elliptical. In this case, a first plane, including the elliptical curved line, is raised such that the curved line becomes circular, and the angle between this plane and the planar surface 2 is measured. Based on this angle, an equation of a second plane which intersects the center line La at right angle is obtained. The end points D and E are found at the intersection points of the center line La and the second plane.

Figure 10:
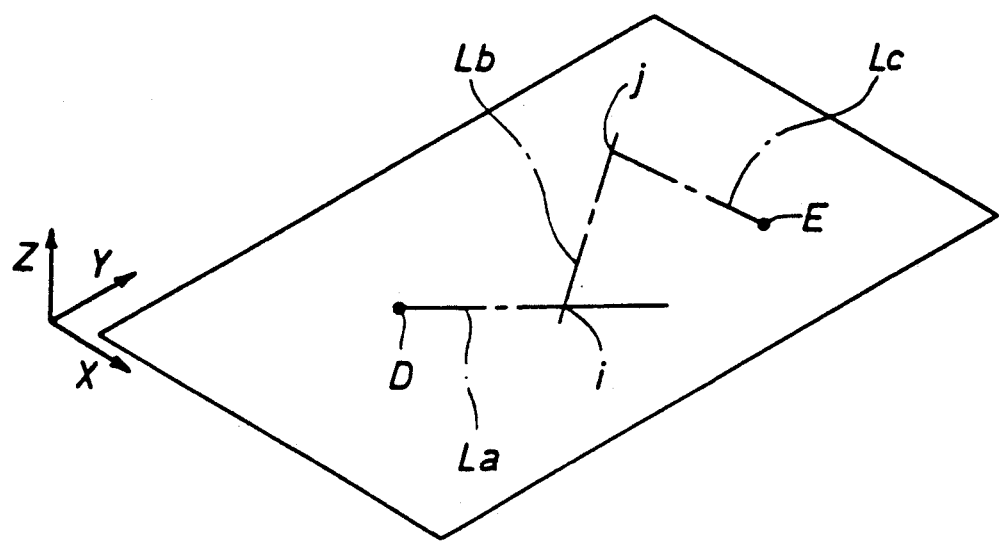
FIG. 10 is an explanatory view showing a display example of a resulting shape of the elongate member.

Intersection points i and j of the center lines La, Lb, and Lc, and the end points D and E are three-dimensionally shown on the display 52 as illustrated in FIG. 10 shown on the X, Y and Z coordinates (Step 210).

The operation of the device for measuring a three-dimensional shape of an elongate member of the present invention is now summarized in sequence. The whole image detector 12 detects the whole image of the member 10. The central points a, b and c of each straight line portion of the member 10 and the temporary end points d and e of the member 10 are obtained from the whole image (Step 120). The first and the second image detectors 14 and 16 detect the enlarged image of the straight line portions of the member 10 according to the central points a, b and c. The central lines of the projected image g and h on the X and Y coordinates on the planar surface 2 are detected from the enlarged image. Then the center line La of the member 10 on the X, Y and Z coordinates is computed from the coordinates of the first image detector 14 (x1, y1, z1), and the coordinates of the second image detector 16 (x2, y2, z2) (Step 180). The center lines Lb and Lc for the central points b and c are thus detected by repeating Step 180 (Step 190).

As aforementioned, the measuring device of the present invention, which is simply constructed of the whole image detector 12 and the first and the second image detectors 14 and 16, can measure the shape of the three-dimensionally bent member 10 by the easy operation of just mounting the member 10 on the planar surface 2.

The present invention may be subject to many modifications and changes without departing from the spirit or essential characteristics thereof. For example, if the member to be measured is s small in size that the image data necessary to achieve a sufficient measuring accuracy can be obtained without scanning the whole image of the member 10 by the first and the second image detectors 14 and 16, the whole image detector 12 and the execution of Step 150 may be omitted. In this case, Steps 170 and 180 are repeated for each straight line portion of the member 10. Moreover, when the general shape of the member 10 is known, the coordinates of general central points and temporary end points may be stored in advance such that the first and the second image detectors 14 and 16 can detect the member 10 without employing the whole image detector 12.

Further, the first scanners 18, 32 and the second scanners 20, 34 may be omitted by mechanically moving the first and the second image detectors 14 and 16 in a direction parallel to the X axis and the Y axis, respectively, for scanning the member 10 on the planar surface 2. The image data is then obtained by moving the image detectors 14 and 16 for each measuring point of the member 10. Additionally, in the measuring device without the scanners 18, 20, 32 and 34, the planar surface 2 may be divided into multiple small areas each of which two pairs of the first and the second image detectors 14 and 16 mounted to detect the member 10 at different angles. The image data is then detected from some of the images in the image detectors 14 and 16 which include the member 10.

Figure 11:
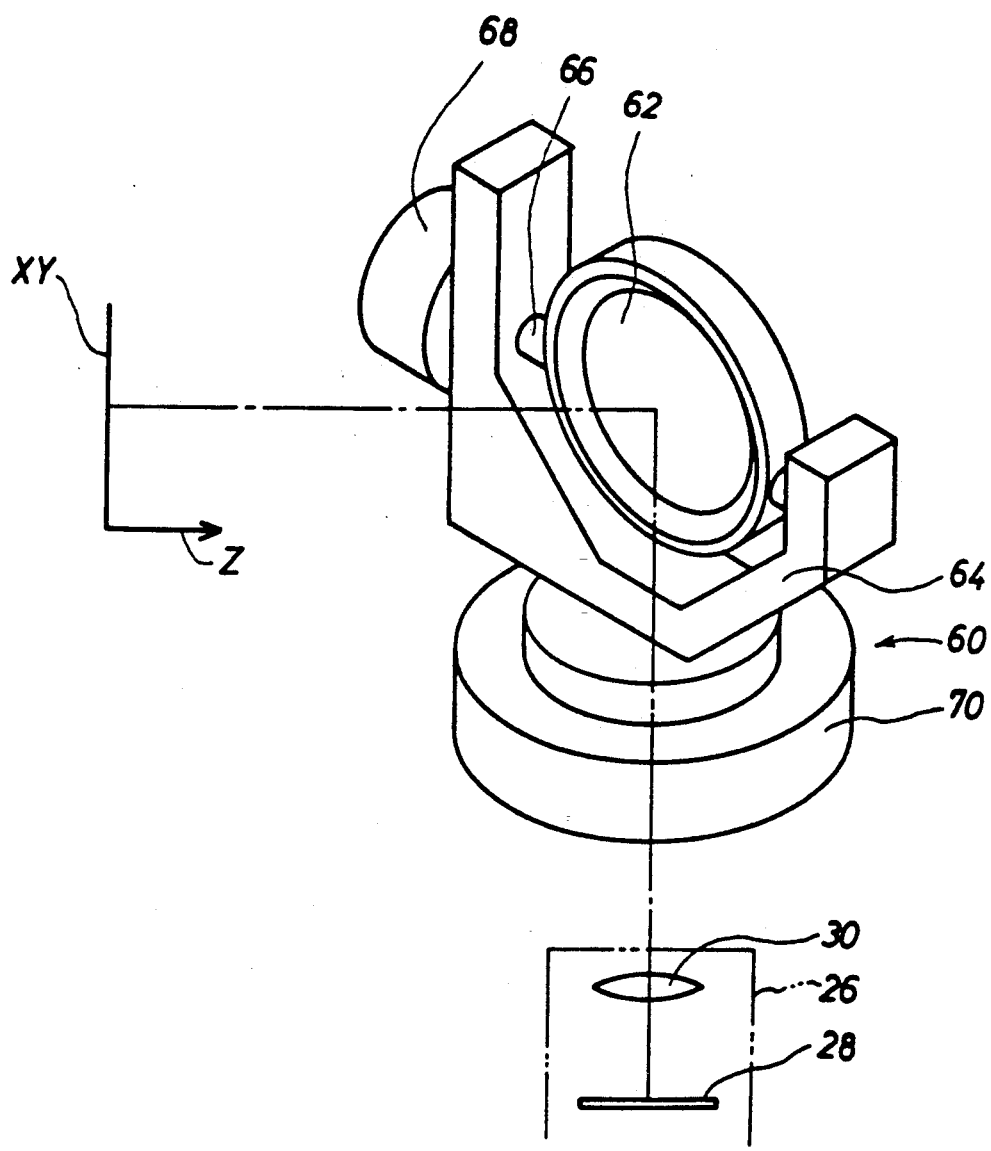
FIG. 11 is a perspective view showing a modified scanner of the device for measuring a three-dimensional shape of an elongate member.

An example of a modified scanner, which may be utilized for the present invention instead of the scanners 18 and 20 of the first image detector 14, and the scanners 32 and 34 of the second image detector 16, is now described with reference to FIG. 11. The modified scanner, which is indicated at 60, has a mirror 62. The mirror 62 is rotatably connected via a rotational axis 66 to a substantially U-shaped rotational frame 64. The rotational axis 66 is located parallel to the mirror surface and is rotated by a pulse motor 68 fixed to the rotational frame 64. Further, the rotational frame 64 is rotated by another pulse motor 70 which rotates about an axis orthogonal to the rotational axis 66. The scanner 60 is positioned in place of the first scanner 18 and the second scanner 20 of the image detector 14. The arrangement is such that an image reflected by the mirror 62 passes through the lens 30 to form on the two-dimensional image pickup element 28. The image data is then output from the two-dimensional image pickup device 26. The scanner 60 can also be positioned in place of the scanners 32 and 34 of the second image detector 16.

The rotational axis 66 in the first image detector 14 is positioned to have an angle of 45 deg to the X axis. The rotational axis 66 in the second image detector 16 is positioned to have an angle of 45 deg to the Y axis. The first image detector 14 and the second image detector 16 are located at the positions (x1, y1, z1) and (x2, y2, z2), respectively. Then a measuring operation is executed in the same manner as the above embodiment. The measuring device employing the scanner 60 is smaller in size than the above embodiment.

An image detector including the scanner 60 and the two-dimensional image pickup device 26 may be moved between the positions (x1, y1, z1) and (x2, y2, z2) by a mechanical moving device (not shown). In this case, the image detector functions as the first image detector 14 at the position (x1, y1, z1), and as the second image detector 16 at the position (x2, y2, z2).

What is claimed is:

1. A device for measuring a three-dimensional shape of a bent elongate member, comprising:
    a first image detector and a second image detector for detecting a two-dimensional image of said elongate member, supported on a planar surface, at measuring points of said elongate member, said first and second image detectors being located adjacent said planar surface and spaced from one another at predetermined positions;
    detected image computing means for computing a central line for each detected image of said elongate member from each two-dimensional image of said elongate member detected by said first and said second image detectors; and
    center line computing means for computing a first plane which includes the central line obtained from said first image detector and the position of said first image detector, and a second plane which includes the central line obtained from said second image detector and the position of said second image detector, whereby a center line for at least a portion of said elongate member is obtained by an intersection of said first and second planes.

2. A device for measuring a three-dimensional shape of an elongate member as recited in claim 1, wherein said planar surface comprises a frosted glass containing at least x and y coordinate indicia thereon and z coordinate being determined relative to said frosted glass planar surface.

3. A device for measuring a three-dimensional shape of an elongate member as recited in claim 1, wherein a light source is positioned below and facing said planar surface to create projected images of said elongate member for detection by said first and second image detectors.

4. A device for measuring a three-dimensional shape of an elongate member as recited in claim 1, wherein said first and second image detectors each comprises:
    a scanner having at least one rotatable mirror;
    means for rotating said at least one rotatable mirror incrementally as desired;
    a two-dimensional image pickup element upon which said two-dimensional image is formed via a reflection from said rotatable mirror; and
    a lens positioned in a reflective path between said two-dimensional image pickup element and said at least one rotatable mirror.

5. A device for measuring a three-dimensional shape of an elongate member as recited in claim 4, wherein said two-dimensional image pickup elements of said first and second image detectors each include means for converting the two-dimensional images into 512×512 pixels.

6. A device for measuring a three-dimensional shape of an elongate member as recited in claim 4, wherein said two-dimensional image pickup elements of said first and second image detectors each include means for converting the two-dimensional images into 512×512 pixels, and each of the 512×512 pixels is converted by said means, according to each pixel's light quality, into an electric charge and output as image data.

7. A device for measuring a three-dimensional shape of an elongate member as recited in claim 1, wherein said first and second image detectors each comprise:
    a first scanner having a first rotatable mirror;
    first means for rotating said first rotatable mirror incrementally as desired;
    a second scanner having a second rotatable mirror which can detect an image reflected from the first mirror of said first scanner;
    second means for rotating said second rotatable mirror incrementally as desired;
    a two-dimensional image pickup element upon which said two-dimensional image is formed via a reflection from said second mirror; and
    a lens positioned in a reflective path between said two-dimensional image pickup element and said second mirror.

8. A device for measuring a three-dimensional shape of an elongate member as recited in claim 1, further comprising a whole image detector positioned adjacent said first and second image detectors, said whole image detector comprising:
    a two-dimensional image pickup element for sensing an entire two-dimensional image of said elongate member; and
    a lens positioned in a reflective path between said two-dimensional image pickup element and said elongate member.

9. A device for measuring a three-dimensional shape of an elongate member as recited in claim 8, wherein a whole image detector and said first and second image detectors are connected to a control circuit, said control circuit comprising:
- a central processing unit;
- a random access memory;
- a read only memory;
- I/O circuit connected with a display; and
- a common bus interconnects the I/O circuit with the central processing unit, the random access memory, and the read only memory; and the central processing unit outputs to the display, employing programs and data stored in the random access memory and the read only memory, results of measurements received from the I/O circuit.

10. A method of measuring a three-dimensional shape of an elongate member having a plurality of substantially straight segments, each straight segment having a central point and end points, comprising the steps of:
- providing a first image detector and a second image detector for detecting a two-dimensional image of said elongate member, supported on a planar surface, at measuring points of said elongate member, said first and second image detectors being located adjacent said planar surface and spaced from one another at predetermined positions;
- providing a projected image computing means for computing a projected image on said planar surface and a central line for each projected image of said elongate member from each two-dimensional image of said elongate member detected by said first and said second image detectors; and
- providing center line computing means for computing a first plane which includes the central line obtained from said first image detector and the position of said first image detector, and a second plane which includes a central line obtained from said second image detector and the position of said second image detector, whereby a center line for said elongate member is obtained by an intersection of said first and second planes.

11. A method of measuring a three-dimensional shape of an elongate member as recited in claim 10, further comprising the step of converting the data into binary code according to a predetermined threshold value.

12. A method of measuring a three-dimensional shape of an elongate member as recited in claim 10, further comprising the step of detecting a whole image of said elongate member using a whole image detector and converting that information into binary code, and
- detecting central points and end points from an outline of said whole image using the whole image detector.

13. A method of measuring a three-dimensional shape of an elongate member as recited in claim 12, further comprising the steps of arranging scanners within said first and second image detectors and rotating said scanners until a projected image of said elongate member corresponds to a center of one of said first and second image detectors.

14. A method of measuring a three-dimensional shape of an elongate member as recited in claim 10, further comprising the step of generating enlarge image data and converting the enlarge image data into binary code.

15. A method of measuring a three-dimensional shape of an elongate member as recited in claim 10, further comprising the step of computing a first plane which includes the central line obtained from said first image detector and the position of said first image detector, and a second plane which includes a central line obtained from said second image detector and the position of said second image detector, for each central line of said elongate member.

16. A method of measuring a three-dimensional shape of an elongate member as recited in claim 10, further comprising the step of computing end points for said elongate member.

17. A method of measuring a three-dimensional shape of an elongate member as recited in claim 10, further comprising the step of resolving said two-dimensional images which are formed on two dimensional image pickup elements within said first and second image detectors into $512 \times 512$ pixels.

18. A method of measuring a three-dimensional shape of an elongate member as recited in claim 17, further comprising the step of converting each of said $512 \times 512$ pixels into an electric charge, according to the pixel's light quality, and outputting the electric charges as image data.

19. A method of measuring a three-dimensional shape of an elongate member as recited in claim 10, wherein the scanning is accomplished by rotating a rotatable mirror to perceive a projected image of said elongate member and reflecting the projected image onto a two-dimensional image pickup element.

20. A method of measuring a three-dimensional shape of an elongate member as recited in claim 10, further comprising the steps of
- calibrating the position of the first image detector and the second image detector prior use;
- illuminating said planar surface, prior to scanning, to form a projected image of the elongate member on said planar surface; and
- displaying data on a display which represents the shape of the three-dimensional elongate member.

21. A method of measuring a three-dimensional shape of an elongate member as recited in claim 10, further comprising the steps of scanning with the first and second image detectors until central points of the projected image correspond to central points of two-dimensional images within the first and second image detectors and recording data indicative of the central points;
- computing each central line of projected images of said elongate member from each of said two-dimensional images of the elongate member detected by said first image detector and said second image detector; and
- computing a first plane which includes the central line obtained from said first image detector and the position of said first image detector, and a second plane which includes a central line obtained from said second image detector and the position of said second image detector for each central line of said elongate member; and
- displaying data which represents the shape of the three-dimensional elongate member.

* * * * *